J. M. VIGIL.
LAND LEVELER AND DRAG.
APPLICATION FILED DEC. 22, 1919.
1,368,585.
Patented Feb. 15, 1921.
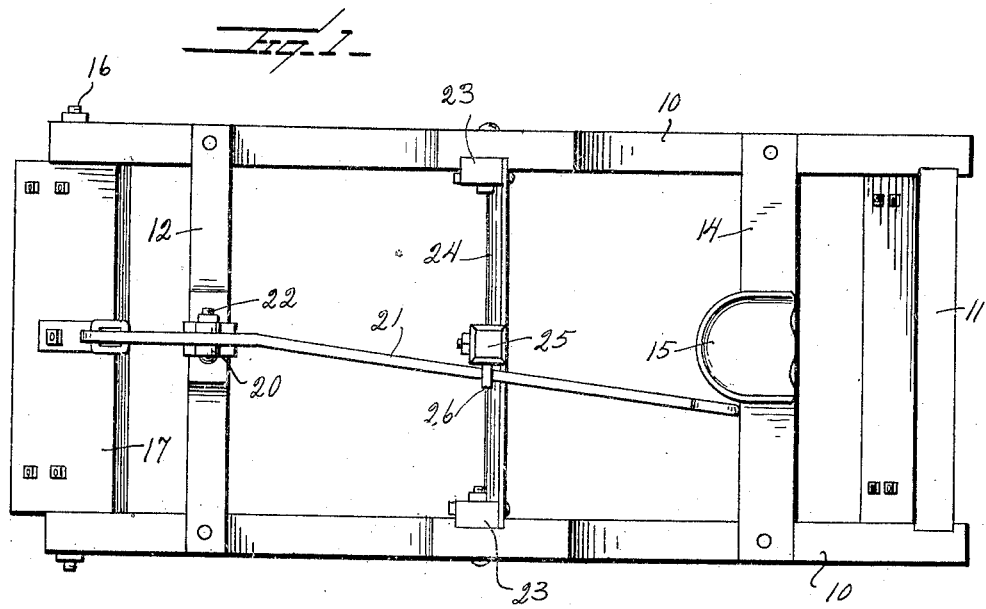
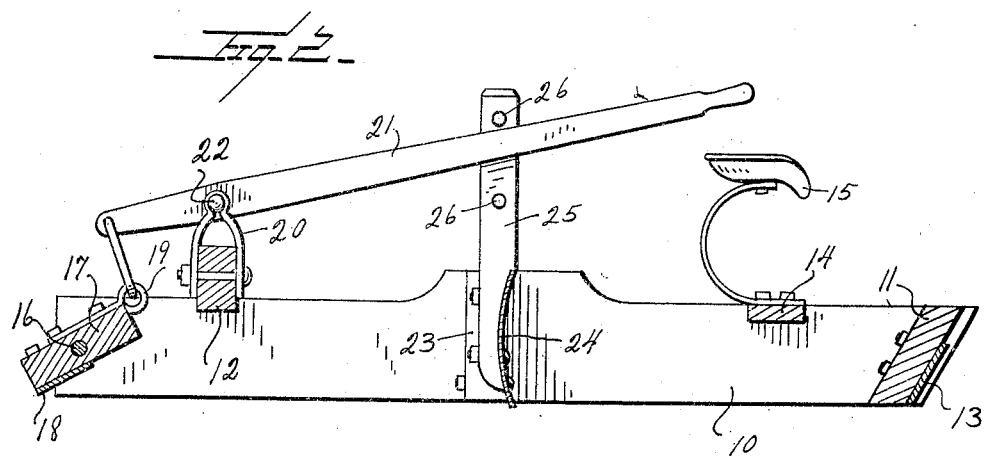
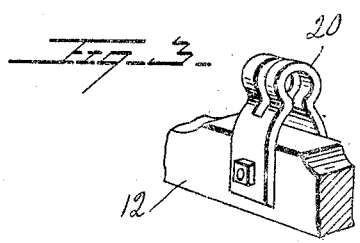
Inventor
J. M. Vigil
By Watson E. Coleman
Attorney

UNITED STATES PATENT OFFICE.

JUAN M. VIGIL, OF CAPULIN, COLORADO, ASSIGNOR OF ONE-THIRD TO RALPH L. CARR, OF ANTONITO, COLORADO.

LAND-LEVELER AND DRAG.

1,368,585. Specification of Letters Patent. Patented Feb. 15, 1921.

Application filed December 22, 1919. Serial No. 346,483.

*To all whom it may concern:*

Be it known that I, JUAN M. VIGIL, a citizen of the United States, residing at Capulin, in the county of Conejos and State of Colorado, have invented certain new and useful Improvements in Land-Levelers and Drags, of which the following is a specification, reference being had to the accompanying drawings.

This invention relates to means in the nature of drags designed to be used for the purpose of leveling land and putting it in condition for planting, and the general object of the invention is to provide a very simple drag and leveler particularly adapted for the purpose described and so constructed that it will either cut down hillocks and projecting bumps, or carry loose earth forward to fill up low places.

A further object is to provide a mechanism of this character including a drag frame having thereon a fixed scraped disposed at its middle and a scraper disposed at its rear end, means being provided whereby the scraper at the rear end may be depressed or raised, thus in the first instance causing the medially disposed scraper to be put out of operation and the rear scraper to be put into operation, or when it is raised, placing the medially disposed scraper in operative position.

Other objects will appear in the course of the following description.

My invention is illustrated in the accompanying drawings, wherein:—

Figure 1 is a top plan view of a drag and leveler constructed in accordance with my invention;

Fig. 2 is a longitudinal sectional view of the same;

Fig. 3 is a perspective detail of the lever supporting brace.

Referring to these drawings, it will be seen that the frame of my improved leveler comprises the two lateral runners or beams 10, connected by a forward transverse brace 11 which is downwardly and rearwardly inclined, and a rear transverse brace 12 which is bolted to the beams 10. A blade 13 or plate of metal is attached to the forward face of the beam 11, as shown in Fig. 2. A transverse brace 14 is attached to the forward ends of the beams 10 and carries a seat 15. Pivotally mounted upon a transverse bolt 16 extending through the rear ends of the beams 10 is an oscillatable scraper 17 in the form of a beam, the forward face of which has attached to it the scraping plate 18. Attached to the rear face of this scraping beam 17 is a strap which is bolted to the beam and formed to provide an eye 19. Mounted upon the middle of the brace 12 is an upwardly inclined iron 20 formed to provide a medially disposed eye, and pivoted to this iron is a lever 21, this lever passing through a slot in the eye and being held to the eye by a transverse bolt 22. This lever extends forward so that its extremity is adjacent the driver's seat 15.

Extending upward from each beam 10 midway of its length is an upright 23, and attached to these uprights, whose forward faces are slightly concaved, is a transversely extending, vertically curved scraper 24. This scraper is attached to the uprights 23 at its ends, as by bolts or otherwise, and attached by bolts to the scraper midway of its length is a standard 25 which, at its upper end, is provided with vertically spaced slots 26 in the form of bolts or lugs, these stops limiting the movement of the lever 21. Suitable draft devices are applied to the frame formed by the members 10, 11, 12, etc., and these draft devices may be attached to the beam 11 or to the ends of the beams 10 or in any other suitable manner.

In the operation of this device, this drag is drawn over the ground and the scrapers act to cut off hillocks or humps in the ground and carry the loose earth into the hollow places. Specifically, this is secured as follows: If the forward end of the lever 21 be forced upward, the scraping beam 17 will be rotated upon its axis to the position shown in Fig. 2, and in this position the scraper 24 will be depressed and will cut down any humps or hillocks. If, on the contrary, the forward end of the lever 21 be depressed, the scraping beam 17 will be rotated so that its lower edge will be disposed below the lower edges of the beams 10 and this will act to raise the beams 10 and thus raise the scraper 24 off the ground. Under these circumstances, the scraper 24 will not cut, but the rear scraper beam 17 will drag the earth along and fill up the holes. The forward and rear scraper beams 11 and 17 will act to crush clods of earth, break up these clods and distribute the crushed earth.

While this device is primarily intended for the purpose of leveling farm land and putting it in shape for planting, it is obvious that it may be also used as a road drag.

I claim:—

1. A drag and leveler of the character described comprising side beams constituting runners and braced from each other, a medially disposed, fixed scraper extending transversely of the line of draft and projecting slightly below the runners, a rearwardly disposed scraper mounted for movement relative to the beams, and manually operable means for shifting the rearwardly disposed scraper into a position below the beams or raising it to a position above the beams.

2. A device of the character described comprising laterally disposed beams constituting runners, braces connecting said beams, a transversely extending, forward scraper beam, a medially disposed, fixed scraper having its lower edge projecting slightly below the lower edge of the runners, a scraper pivotally mounted between the rear ends of the runners for oscillating movement, said last named scraper beam when turned to a vertical position extending slightly below the lower edges of the runners, and a lever operatively connected to the pivoted scraper beam whereby its lower edge may be carried to a position above the lower edges of the runners or below the lower edges of the runners.

3. A leveler and drag comprising laterally disposed runner beams, braces connecting the latter, a transversely extending, downwardly and rearwardly inclined scraper beam mounted upon the forward ends of the runner beams and having its lower edge flush with the lower edges of the runner beams, a rearwardly disposed scraper beam pivotally mounted between the rear ends of the runner beams for oscillating movement in a vertical plane, a seat mounted upon the forward end of the leveler, a lever pivotally mounted upon one of said braces and operatively connected at its rear end to the pivoted scraper beam, the forward end of the lever extending adjacent said seat, a transversely extending, fixed scraper blade mounted between the runner beams and extending slightly below the lower edges thereof, and a standard attached to the middle of said last named scraper and having laterally projecting stops between which said lever operates.

In testimony whereof I hereunto affix my signature.

JUAN M. VIGIL.